Oct. 21, 1969 HUGH L. DRYDEN 3,474,413
DEPUTY ADMINISTRATOR OF THE NATIONAL AERONAUTICS
AND SPACE ADMINISTRATION

PARALLEL GENERATION OF THE CHECK BITS OF A PN SEQUENCE

Filed Nov. 22, 1965 3 Sheets-Sheet 1

INVENTORS
TAGE O. ANDERSON
WARREN A. LUSHBAUGH
BY
ATTORNEYS

| CHECK BIT | $X_n$ | $X_1$ | $X_2$ | $X_3$ | $X_4$ | $X_5$ | $X_6$ |
|---|---|---|---|---|---|---|---|
| | 1 | 1 | | | | | |
| | 2 | | 1 | | | | |
| | 3 | | | 1 | | | |
| | 4 | | | | 1 | | |
| | 5 | | | | | 1 | |
| | 6 | | | | | | 1 |
| 1 | 7 | 1 | 1 | | | | |
| 2 | 8 | | 1 | 1 | | | |
| 3 | 9 | | | 1 | 1 | | |
| 4 | 10 | | | | 1 | 1 | |
| 5 | 11 | | | | | 1 | 1 |
| 6 | 12 | 1 | 1 | | | | 1 |
| 7 | 13 | 1 | | 1 | | | |
| 8 | 14 | | 1 | | 1 | | |
| 9 | 15 | | | 1 | | 1 | |
| 10 | 16 | | | | 1 | | 1 |
| 11 | 17 | 1 | 1 | | | 1 | |
| 12 | 18 | | 1 | 1 | | | 1 |
| 13 | 19 | 1 | 1 | 1 | 1 | | |
| 14 | 20 | | 1 | 1 | 1 | 1 | |
| 15 | 21 | | | 1 | 1 | 1 | 1 |
| 16 | 22 | 1 | 1 | | 1 | 1 | 1 |
| 17 | 23 | 1 | | 1 | | 1 | 1 |
| 18 | 24 | 1 | | | 1 | | 1 |
| 19 | 25 | 1 | | | | 1 | |
| 20 | 26 | | 1 | | | | 1 |
| 21 | 27 | 1 | 1 | 1 | | | |
| 22 | 28 | | 1 | 1 | 1 | | |
| 23 | 29 | | | 1 | 1 | 1 | |
| 24 | 30 | | | | 1 | 1 | 1 |
| 25 | 31 | 1 | 1 | | | 1 | 1 |
| 26 | 32 | 1 | | 1 | | | 1 |
| 27 | 33 | 1 | | | 1 | | |

| CHECK BIT | $X_n$ | $X_1$ | $X_2$ | $X_3$ | $X_4$ | $X_5$ | $X_6$ |
|---|---|---|---|---|---|---|---|
| 28 | 34 | | 1 | | | 1 | |
| 29 | 35 | | | 1 | | | 1 |
| 30 | 36 | 1 | 1 | | 1 | | |
| 31 | 37 | | 1 | 1 | | 1 | |
| 32 | 38 | | | 1 | 1 | | 1 |
| 33 | 39 | 1 | 1 | | 1 | 1 | |
| 34 | 40 | | 1 | 1 | | 1 | 1 |
| 35 | 41 | 1 | 1 | 1 | 1 | | 1 |
| 36 | 42 | 1 | | 1 | 1 | 1 | |
| 37 | 43 | | 1 | | 1 | 1 | 1 |
| 38 | 44 | 1 | 1 | 1 | | 1 | 1 |
| 39 | 45 | 1 | | 1 | 1 | | 1 |
| 40 | 46 | 1 | | | 1 | 1 | |
| 41 | 47 | | 1 | | | 1 | 1 |
| 42 | 48 | 1 | 1 | 1 | | | 1 |
| 43 | 49 | 1 | | 1 | 1 | | |
| 44 | 50 | | 1 | | 1 | 1 | |
| 45 | 51 | | | 1 | | 1 | 1 |
| 46 | 52 | 1 | 1 | | 1 | | 1 |
| 47 | 53 | 1 | | 1 | | 1 | |
| 48 | 54 | | 1 | | 1 | | 1 |
| 49 | 55 | 1 | 1 | 1 | | 1 | |
| 50 | 56 | | 1 | 1 | 1 | | 1 |
| 51 | 57 | 1 | 1 | 1 | 1 | 1 | |
| 52 | 58 | | 1 | 1 | 1 | 1 | 1 |
| 53 | 59 | 1 | 1 | 1 | 1 | 1 | 1 |
| 54 | 60 | 1 | | 1 | 1 | 1 | 1 |
| 55 | 61 | 1 | | | 1 | 1 | 1 |
| 56 | 62 | 1 | | | | 1 | 1 |
| 57 | 63 | 1 | | | | | 1 |

FIG. 2

*INVENTORS*
TAGE O. ANDERSON
WARREN A. LUSHBAUGH
BY
ATTORNEYS

INVENTORS
TAGE O. ANDERSON
WARREN A. LUSHBAUGH
BY
ATTORNEYS

United States Patent Office 3,474,413
Patented Oct. 21, 1969

3,474,413

PARALLEL GENERATION OF THE CHECK BITS OF A PN SEQUENCE

Hugh L. Dryden, Deputy Administrator of the National Aeronautics and Space Administration, with respect to an invention of Tage O. Anderson, Arcadia, and Warren A. Lushbaugh, Los Angeles, Calif.

Filed Nov. 22, 1965, Ser. No. 510,150
Int. Cl. G06f *11/00*
U.S. Cl. 340—146.1 7 Claims

ABSTRACT OF THE DISCLOSURE

A circuit for generating in parallel 57 check bits of a 63-bit PN code as a function of 6 bits of an input code word, the bits of which comprise 6 of the bits of the PN code. The circuit includes 57 two-input mod-2 gates, arranged in a tree-like structure of a plurality of tree levels. Each of fifteen gates, which form a first group of gates in the first tree level, responds to two of the six bits of the code word, while each of 35 gates, defining a second group of gates in the second tree level, has at least one input connected to the output of one of the gates in the first group. Seven of the remaining gates form a third group of gates in the third tree level, with each one of these gates having at least one input connected to the output of one of the gates in the second group.

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

This invention relates to logic circuitry and more particularly to a logic circuit for generating a multibit binary code word in parallel.

Various techniques are presently employed to generate different types of multibit sequences which find varied uses in binary circuit application. One such sequence of binary digits is known as a "maximum length shift register sequence," sometimes also referred to as a pseudo-noise sequence, which hereafter will be referred to as PN code or sequence.

A maximum length code can be generated by a $k$-bit shift register, whose input is a modulo or mod 2 circuit for two or more of $k$ bits. The $k$-bit register assumes all $2^k-1$ different states other than the all zero state. Sequences generated by different starting positions are merely cyclic shifts of one another. The register could then be realigned one step per complete cycle to provide the other sequences of the dictionary. The $2^k-1$ sequences, each of $2^k-1$ bits, can be thought of as comprising a complete PN dictionary. If the object is to generate the complete PN dictionary in parallel which is the case in some PN code applications, that is generate in parallel $2^k-1$ words each of $2^k-1$ bits, a recycling shift register of $2^k-1$ bits can be used.

The $2^k-1$ bit register would be preset to one of the possible sequences. The complete dictionary would be generated by recycling the register. Though such an arrangement is feasible, it requires a register of $2^k-1$ bits which is quite expensive, especially when $k$ is large. For example, when $k$ is equal to six, a sixty-three bit register is required. Another disadvantage of the above-described technique is the time consumed in recycling the $2^k-1$ bit register to the desired position requiring in the worst case $2^k-1$ clock periods.

Accordingly, it is an object of the invention to provide a novel arrangement for generating in parallel the bits of a PN code.

Another object is the provision of a simple arrangement for generating in parallel the bits of a PN code with a minimum of propagation time.

A further object is the provision of a relatively simple arrangement for generating in parallel the bits of a PN code which is less expensive than prior art arrangements.

Yet a further object is to provide a new arrangement for generating in parallel $2^k-1$ bits of a PN code without the need for a $2^k-1$ bit register and in a shorter time period than is feasible when using the $2^k-1$ bit register.

Still a further object is the provision of an arrangement for generating in parallel bits of a binary code in which the loading on the various circuits in the arrangement is optimized.

These and other objects of the invention are achieved by providing a network in which simple two-variable mod 2 circuits with single-term inputs are cascaded so that all the bits of the PN code produced in response to $k$ information bits of a code word are generated with a minimum of propagation time. The PN code may be changed merely by changing the $k$ information bits of the code word. Emphasis has been placed on an even load distribution among the original information bits of the code word as well as among the cascaded mod 2 circuits.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 2 is a table in which each bit of a PN code of $2^6-1$ bits is diagrammed as a function of the six information bits;

Figure 1:
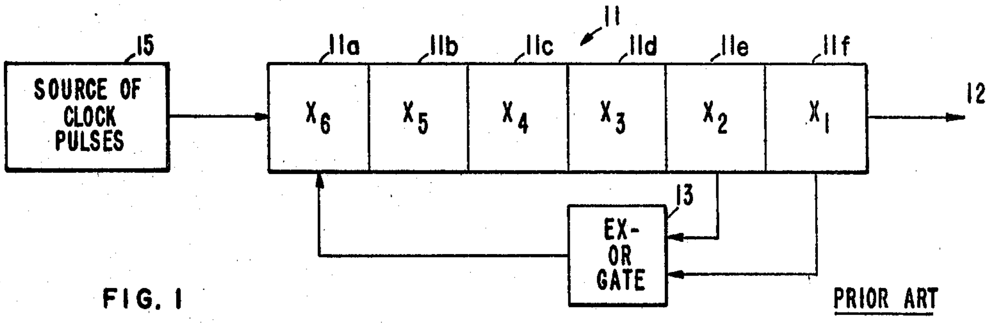
FIGURE 1 is a block diagram of a prior art arrangement for generating a PN code in series.

Before describing the novel teachings of the present invention, reference is made to FIGURE 1 which is a simplified diagram of a shift register 11 useful in generating a PN code in series. Register 11 is shown comprising six stages 11*a* through 11*f*, with the last stage 11*f* being connected to an output terminal 12 and to one input of an Exclusive-Or or mod 2 gate 13. The other input to gate 13 is provided from the output of next-to-the-last stage 11_e_, while the output of the gate 13 is used as the bit input to the first stage 11_a_. A source of clock pulses 15 is used to provide clock pulses to advance the contents of the register stages, one stage per clock pulse period.

Assuming that information bits $X_1$ through $X_6$ of a code word are stored in the register as shown, it is appreciated that during the first clock pulse period bit $X_1$ will be transferred to terminal 12, bits $X_2$ through $X_6$ will shift to stages 11_f_, 11_e_, 11_d_, 11_c_ and 11_b_, respectively and in stage 11_a_, the output of gate 13 representing the mode 2 function of bits $X_1$ and $X_2$ will be stored. Similarly, during each subsequent clock period, the contents of register 11 will advance by one stage and a signal representing the Exclusive-Or function of the bits in stages 11_e_ and 11_f_ will be stored in stage 11_a_.

When a six bit code word is used, the PN code comprises a $2^6-1=63$ bits, with the first six bits representing the six information bits. The other fifty-seven bits may be thought of as check bits. The recursion relation between the elements of the sequence is $$X_n=X_{n-6}\oplus X_{n-5}$$

where $\oplus$ represents the mod 2 or Exclusive-Or function. Each of the clock bits of the PN code may be expressed as some mod 2 function of the information bits $X_1$ through $X_6$. For example, $$X_{13}=X_7\oplus X_8$$

but $$X_7=X_1\oplus X_2$$

and $$X_8=X_2\oplus X_3$$

so that $$X_{13}=X_1\oplus X_2\oplus X_2\oplus X_3$$

Since $$X_2\oplus X_2=0$$

$$X_{13}=X_1\oplus X_3$$

From the foregoing, it can be seen that each of the check bits can be reduced to a mod 2 function of two or more of the information bits. When six information bits are used, i.e. $k=6$, each of the check bits can be reduced to a mod 2 function of from two to six of the information bits. FIGURE 2 to which reference is made herein is a table wherein each bit designated $X_n$ of the PN code is charted as a function of the six information bits $X_1$ through $X_6$. Except for each of the first six bits of the code which is related to one of the information bits, each of the other fifty-seven bits is a function of two or more of the six information bits. Thus for example the seventh bit of the code, i.e. $n=7$, which is the first check bit is the mod 2 function of $X_1$ and $X_2$, while the 16th code bit or 11th check bit is a function of $X_1\oplus X_2\oplus X_5$, and the 59th code bit or the 53rd check bit is a mod 2 function of all six information bits, i.e.

$$X_{59}=X_1\oplus X_2\oplus X_3\oplus X_4\oplus X_5\oplus X_6$$

Figure 3:
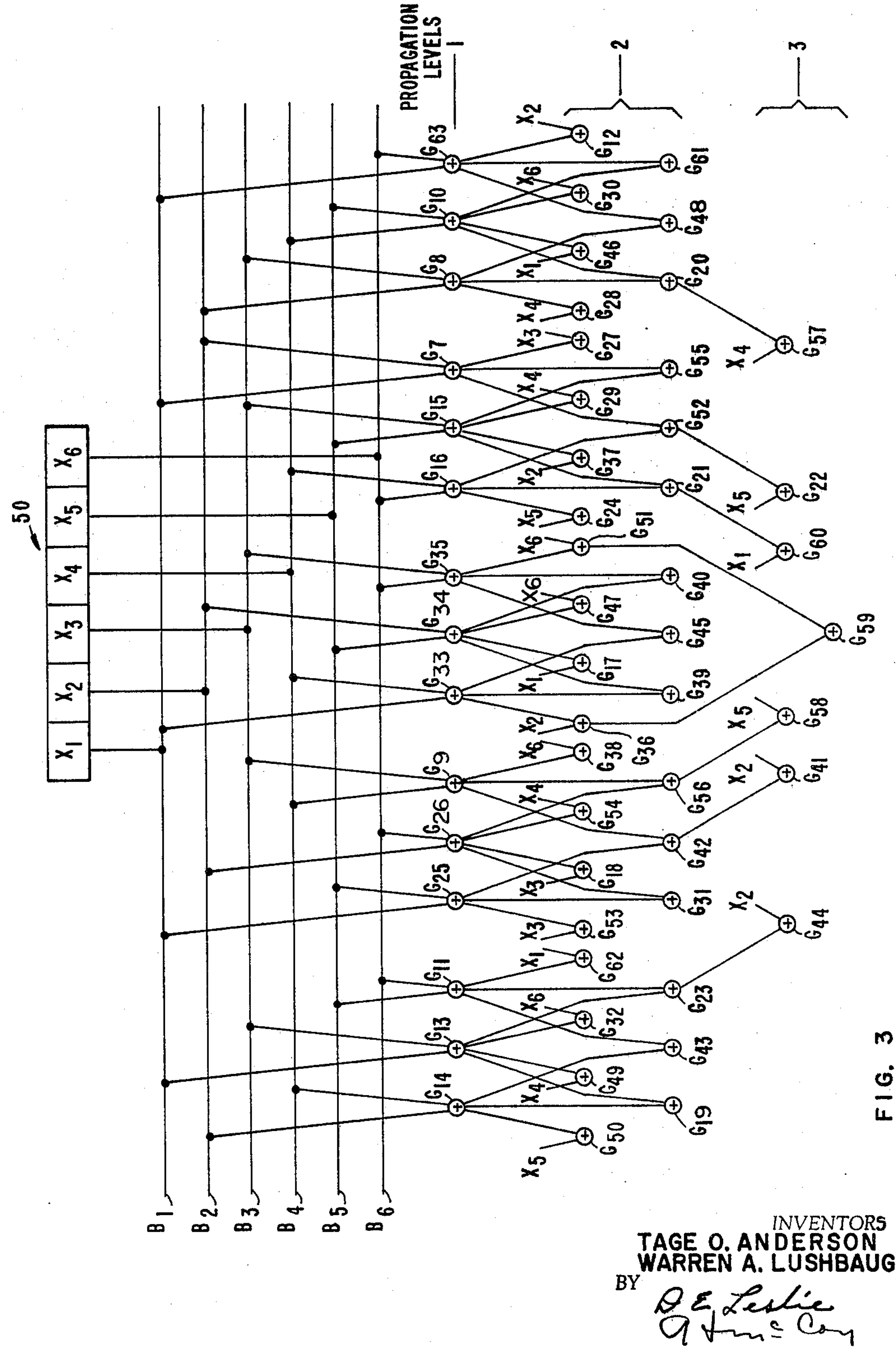
FIGURE 3 is a diagram of of a tree-like gating structure of the present invention for providing in parallel fifty-seven check bits of a 63-bit PN code.

These characteristics are utilized in the novel circuit of the present invention which may best be explained in conjunction with FIGURE 3 to which reference is made herein. The circuit which is a tree-like gating structure includes fifty-seven gates $G_7$ through $G_{63}$, each one of which is a mod 2 circuit or gate performing the Exclusive-OR or mod 2 function of two variables. The output of each one of the gates represents another check bit of the PN code with the numerical subscript designating the bit number in the code. Thus for example the output of gate $G_{14}$ is the 14th bit of the code (i.e. $n=14$) or the 8th check bit, which as seen from FIGURE 2 is a function of $X_2$ and $X_4$. In addition the outputs of some of the gates are used as inputs to other gates. The same number of gates as there are outputs are cascaded so as to minimize the propagation time required to provide all the check bits in parallel. This is accomplished by minimizing the number of levels in which the gates are arranged. An additional advantage of the arrangement shown in FIGURE 3 is the optimal balance of the load between the various gates, which will be explained hereafter in more detail.

The circuit of the invention may include a register 50 in which the six information bits $X_1$ through $X_6$ are entered in the register's six stages. Each stage may then be connected to an output buss to which the various gate inputs may be coupled. The busses associated with the stages in which $X_1$ through $X_6$ are stored are designated as $B_6$ through $B_1$ respectively. The fifteen gates used to provide the bits which are the function of only two of the information bits are arranged in a first propagation level, with each gate being connected to two of the six busses. These gates may be thought of as generating two-variable terms.

As seen from FIGURE 2, twenty of the code bits are a function of three of the six information bits. Each of these terms is provided in the present invention by combining the output of one of the gates producing a two-variable term with one of the information bits in another mod 2 gate. For example, the 50th code bit, which as seen from FIGURE 2 is a function of $X_2$, $X_4$ and $X_5$, is produced in gate $G_{50}$ which is provided with $X_5$ and with the output of gate $G_{14}$ which performs the mod 2 function of $X_2$ and $X_4$. It is appreciated that since each three-variable term is produced by utilizing a two-variable term produced in another gate, the time required to produce a three-variable term is that of the propagation time through two gates connected in series. Therefore, the gates producing the three-variable terms can be thought of as being in a second propagation level.

It is seen from FIGURE 2 that fifteen code bits are functions of four information bits. These are produced in fifteen gates, each one of which receives as its two inputs the outputs of two gates which produce the two-variable terms. For example, the nineteenth code bit which is a function of $X_1$, $X_2$, $X_3$ and $X_4$ is produced by gate $G_{19}$ which, as seen in FIGURE 3, receives its inputs from gates $G_{14}$ and $G_{13}$ in which the mod 2 function of $X_2$ and $X_4$ and $X_1$ and $X_3$ are respectively performed. Since the four-variable terms are produced by signals which must first propagate through gates providing two-variable terms, the gates providing the four-variable terms may be thought of as being in the second propagation level.

From FIGURE 3 it should be noted that the fifteen four-variable terms are produced by utilizing each of the outputs of the gates providing the two-variable terms, twice. For example, gate $G_{14}$ is used to provide inputs to gates $G_{19}$ and $G_{43}$. Thus the loading of the gates providing the two-variable terms by the gates providing the four-variable terms is evenly distributed. Also each one of the gates producing a two-variable term is also used to supply an input to one or two of the gates providing the three-variable terms. Thus the loading of the gates providing the two-variable terms is optimized in that each gate provides inputs to either three or four other gates.

Each of the six code bits which is a function of five terms or five information bits, such as code bit 44 which is a function of $X_1$, $X_2$, $X_3$, $X_5$ and $X_6$ is formed by combining, in a separate gate, the output of the gate providing a four-variable term with one of the information bits. For example, bit 44 is produced in gate $G_{44}$ which is connected to $X_2$ and to the output of $G_{23}$ which provides the mod 2 function $X_1\oplus X_3\oplus X_5\oplus X_6$. In a similar manner is formed the only code bit which is a function of all six information bits, namely bit 59. It is produced in gate $G_{59}$ which is provided with the outputs of gates $G_{36}$ and $G_{51}$, each of which is a three-variable term. A five-variable term may also be provided by a gate supplied with the output of a gate providing a three-variable term and the output of a gate providing a two-variable term.

Since the gate providing the five-variable terms or the six-variable term are supplied with signals from gates in the second propagation level, it is appreciated that the time required to produce such terms equals the propagation time through three serially connected gates. Therefore, these gates can be regarded as being in the third propagation level.

From the foregoing, it is thus seen that in accordance with the teachings of the invention, the check bits of a PN code are generated in parallel as the outputs of gates $G_6$ through $G_{63}$ with the binary value of each bit being a function of information bits $X_1$ through $X_6$ in register 30. By changing the $X_1$ through $X_6$, i.e. changing the code word, any desired sequence of the check bits of the PN code may be derived. Furthermore, it should be appreciated that the propagation time for providing all the bits in parallel is only the time required for the signals to propagate through three serially arranged mod 2 gates. Also by utilizing a tree-like gating arrangement as shown in FIGURE 3, the loading of the outputs of the various gates is optimally balanced.

Figure 4:
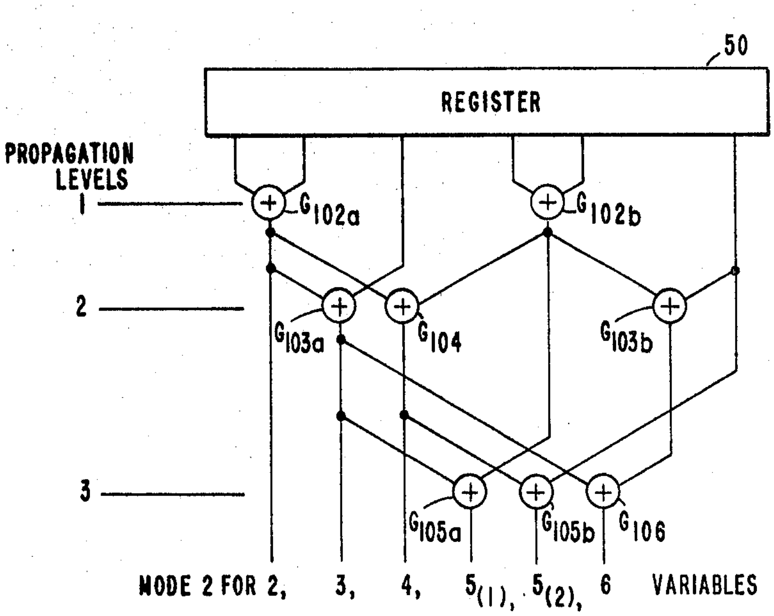
FIGURE 4 is a diagram useful in summarizing the principles of the present invention.

The tree-like gating arrangement of FIGURE 3 may be summarized in conjunction with FIGURE 4 to which reference is made herein. It can be stated that a two-variable term is provided by connecting gates such as $G_{102a}$ and $G_{102b}$ to register 30 in which the information bits of the code word are stored. Three-variable terms are produced in gates such as $G_{103a}$ and $G_{103b}$ by supplying thereto one of the information bits and the output of a gate producing a two-variable term. The four-variable term is produced in a gate $G_{104}$ supplied with inputs from two gates in each of which a two-variable term is produced.

The five-variable term may be produced in either of two ways. In one arrangement, the gate such as $G_{105a}$ is supplied with the output of the gate providing a three-variable term such as $G_{103a}$ and the output of a gate providing a two-variable term such as $G_{102b}$. The other arrangement for providing a five-variable term is to connect the term producing gate such as $G_{105b}$ to the output of the gate producing a four-variable term such as gate $G_{104}$ and to one of the information bits in the register. The six-variable term is produced in a gate such as $G_{106}$ to which are supplied the outputs of two gates such as $G_{103a}$ and $G_{103b}$, each providing a three-variable term. Such an arrangement results in a minimum propagation time and optimized loading of the gates.

As herebefore stated, the outputs of the fifty-seven gates $G_6$ through $G_{63}$ represent the fifty-seven check bits of the PN code. The first six bits of the code, i.e. $X_1$ through $X_6$, may be directly provided from the register 30 or from busses $B_1$ through $B_6$ respectively. Thus the arrangement shown in FIGURE 3 may be utilized to generate in parallel all the bits of a PN code or sequence of sixty-three bits. The code or sequence can be changed by storing a different code word in register 30.

There has accordingly been shown and described herein a novel arrangement for generating in parallel all the bits of a PN code. Although the invention has been described in connection with generating a PN code of length $2^k$-1 where $k$ was chosen to be 6, the bits of a PN code of any desired length may be generated in parallel. Furthermore, it is appreciated that modifications may be made in the arrangements as shown without departing from the true spirit of the invention.

What is claimed is:

1. A circuit for generating in parallel L bits of a selected binary code formed as a function of $k$ information bits comprising a code word, L being equal to $2^k-1$, the circuit including:

means for receiving the $k$ information bits of said code word to provide $k$ bits of said selected binary code, each of said $k$ code bits corresponding to a different one of said $k$ information bits; and $2^k-1-k$ gating means interconnected in a tree-like gating structure each gating means providing a bit output which represents a different one of $2^k-1-k$ bits of said selected binary code, the bit output of each gating means being a function of two or more of said information bits, said gating means being interconnected so that the gating means which provide bit outputs as a function of more than two of said information bits are connected to the outputs of gating means providing bit outputs which are a function of a smaller number of information bits, said circuit including means for interconnecting said gating means to provide $2^k-1-k$ bits of a pseudo-noise code, and wherein said circuit includes means for connecting said gating means in said tree-like gating structure in first, second and third tree levels, including means for connecting the gating means in said first level directly to said means for receiving for directly responding to two of said $k$ information bits, means connecting each gating means in said second level to the output of at least one of the gating means in said first tree level, and means connecting each gating means in said third tree level to the output of at least one of the gating means in said second tree level.

2. The circuit defined in claim 1 wherein each of said plurality of gating means is a mod 2 gate having two inputs and an output; and said means connecting the gating means in said second tree level include means for connectig the two iputs of each of a plurality of gating means in said second level directly to the outputs of two of the gating means in said first tree level, the recursion relationship between bits in said code being $X_n=X_{n-5}\oplus X_{n-6}$, wherein $K+1<n<L$.

3. The circuit defined in claim 2 wherein said plurality of gating means includes $2^k-1-k=57$ mod 2 circuits, said means interconnecting said gating means interconnect the circuits with 15 of said 57 circuits in said first tree level, 7 of said 57 circuits in said third tree level and the rest of said 57 circuits in said second tree level, whereby the maximum time required to generate said code bits is a function of the time required for three successive mod 2 circuits to perform mod 2 addition.

4. A circuit for generating in parallel L—$k$ check bits of a pseudo-noise code of length L as a function of $k$ information bits of a code word, where $L=2^k-1$ bits, the circuit comprising:

L—$k$ mod 2 gates, each having an output and two inputs, the output being the mod 2 function of the two inputs, the output of each gate representing a different one of the L—$k$ check bits of said code;

first means for supplying combinations of two of said $k$ information bits to each gate in a first group of said mod 2 gates to form a first gate level; and second means for connecting at least one input of each gate in a second group of said L—$k$ gates to the output of one of the gates in said first group, to form a second group level, said second group including at least one gate having each of its two inputs connected to the output of a different one of the gates in said first group.

5. The circuit defined in claim 4 wherein said second means connect at least one input of each mod 2 gate which provides a check bit which is a function of more than two of said information bits to the output of a mod 2 gate in said first group which provides a check bit which is a function of only two of said information bits, to minimize the propagation time for providing said L—$k$ check bits in parallel, said second means connecting the two inputs of at least one gate in said second group to the outputs of two different gates in said first group, the recursion relation between bits in said code being $$X_n=X_{n-5}\oplus X_{n-6},$$

wherein $1<n<L-k$ of said check bits.

6. The circuit defined in claim 5 further including third means for connecting at least one input of each gate of a third group of gates of said L—*k* gates to the output of one gate in said second group.

7. The circuit defined in claim 6 wherein $k=6$, and said first means supply information bits to each of 15 gates which form said first group, said second means connect at least one input of each of 35 gates forming said second group to the output of one of the gates in the first group and said third means connect at least one input of each of 7 gates which form said third group to the output of one of the gates in said second group, whereby the maximum time required to generate said code bits is a function of the time required for three successive mod 2 circuits to perform mod 2 addition.

References Cited

UNITED STATES PATENTS

| | | | |
|---|---|---|---|
| 3,278,729 | 10/1966 | Chien | 235—153 |
| 3,383,655 | 5/1968 | McRae | 235—153 X |

FOREIGN PATENTS

| | | |
|---|---|---|
| 205,802 | 2/1957 | Australia. |

MALCOLM A. MORRISON, Primary Examiner

R. STEPHEN DILDINE, Jr., Assistant Examiner

U.S. Cl. X.R.

235—153